(12) United States Patent
Katrak et al.

(10) Patent No.: US 7,917,270 B2
(45) Date of Patent: Mar. 29, 2011

(54) OPERATION OF ELECTRONIC STABILITY CONTROL SYSTEMS USING DATA FROM A PLURALITY OF SOURCES

(75) Inventors: Kerfegar K. Katrak, Fenton, MI (US); Hualin Tan, Novi, MI (US); David M. Sidlosky, Beverly Hills, MI (US); Theresa M. Kondel, Byron, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 857 days.

(21) Appl. No.: 11/764,869

(22) Filed: Jun. 19, 2007

(65) Prior Publication Data

US 2008/0319622 A1  Dec. 25, 2008

(51) Int. Cl.
*G06F 19/00* (2006.01)
*G06G 7/00* (2006.01)

(52) U.S. Cl. .............. 701/70; 701/1; 701/37; 701/38; 701/39; 701/40; 701/76; 701/82; 280/5.5; 280/5.507; 303/140

(58) Field of Classification Search .......... 701/1, 37–40, 701/70, 71, 76, 82; 280/5.5, 5.507; 303/140
See application file for complete search history.

(56) References Cited

U.S. PATENT DOCUMENTS

| | | | | |
|---|---|---|---|---|
| 5,642,281 A * | 6/1997 | Ishida et al. | | 701/41 |
| 6,056,371 A * | 5/2000 | Lin et al. | | 303/146 |
| 2002/0087247 A1* | 7/2002 | Tanaka et al. | | 701/70 |
| 2006/0064214 A1* | 3/2006 | Takimoto et al. | | 701/41 |
| 2008/0288135 A1* | 11/2008 | Katrak et al. | | 701/33 |

* cited by examiner

*Primary Examiner* — Jack Keith
*Assistant Examiner* — Chuong P Nguyen
(74) *Attorney, Agent, or Firm* — Ingrassia Fisher & Lorenz, P.C.

(57) ABSTRACT

A method for operating a vehicle electronic stability control ("ESC") system utilizing values for a variable obtained from a primary source and a redundant source includes the steps of receiving a first value for the variable from the primary source, receiving a second value for the variable from the redundant source, generating a normalized value as a function of the first value and the second value, determining whether the primary source is operating correctly, utilizing the first value for operation of the vehicle ESC system if the primary source is operating correctly, and utilizing the second value for operation of the vehicle ESC system if the primary source is not operating correctly and the second value is not greater in absolute value than the normalized value.

15 Claims, 2 Drawing Sheets

OPERATION OF ELECTRONIC STABILITY CONTROL SYSTEMS USING DATA FROM A PLURALITY OF SOURCES

TECHNICAL FIELD

The present invention generally relates to control systems found in automobiles and other vehicles, and more particularly relates to electronic stability control systems and methods of operation thereof using data from a plurality of sources.

BACKGROUND OF THE INVENTION

Modern automobiles and other vehicles may include sophisticated on-board computer systems that monitor the status and performance of various components of the vehicle (for example, the vehicle engine, transmission, brakes, suspension, and/or other components of the vehicle). Many of these computer systems may also adjust or control one or more operating parameters of the vehicle in response to operator instructions, road or weather conditions, operating status of the vehicle, and/or other factors.

Many conventional vehicles today include various types of electronic stability control ("ESC") systems to further improve the vehicle's handling. Today's ESC systems often include various types of supervisory control modules (SCMs), engine control modules (ECMs), and/or controllers for various vehicle components (for example, anti-lock brakes, electronically-controlled transmissions, or other components), among other modules.

Such ESC systems are often implemented with microprocessors, microcontrollers or other control devices that appropriately receive data from one or more sensors or other sources, process the data to create suitable output signals, and provide the output signals to control actuators, dashboard indicators, data responders, and/or other modules as appropriate. The various components of a vehicle-based control system typically inter-communicate with each other and/or with various sensors, actuators and the like across serial and/or parallel data links such as a Controller Area Network (CAN), an example of which is described in ISO Standard 11898-1 (2003).

For example, an ESC system may compare a driver's intended actions in steering, braking, and/or other actions with the vehicle's response. Such comparisons may utilize variables such as yaw rates, lateral acceleration rates, and/or various other variables. The vehicle ESC system can then apply the brakes, reduce any excess engine power, and/or take other corrective measures. While ESC systems are generally effective at improving vehicle control, it can be difficult to design an ESC system that effectively transitions out of ESC operation or control when one or more sources of data may be compromised.

Accordingly, there is a need for an improved method and system for an improved transition out of ESC operation or control when one or more sources of data may be compromised. Other desirable features and characteristics will become apparent from the subsequent detailed description and the appended claims, taken in conjunction with the accompanying drawings and the foregoing technical field and background.

SUMMARY OF THE INVENTION

A method is provided for operating a vehicle electronic stability control ("ESC") system utilizing values for a variable obtained from a primary source and a redundant source. In one embodiment, and by way of example only, the method comprises the steps of receiving a first value for the variable from the primary source, receiving a second value for the variable from the redundant source, generating a normalized value as a function of the first value and the second value, determining whether the primary source is operating correctly, utilizing the first value for operation of the vehicle ESC system if the primary source is operating correctly, and utilizing the second value for operation of the vehicle ESC system if the primary source is not operating correctly and the second value is not greater in absolute value than the normalized value.

In another embodiment, and by way of example only, the vehicle ESC system utilizes values for a yaw rate variable obtained from a primary yaw data source and a redundant yaw data source and values for a lateral acceleration variable obtained from a primary lateral acceleration data source and a redundant lateral acceleration data source, and the method comprises the steps of receiving a first yaw value from the primary yaw data source and a second yaw value from the redundant yaw data source, receiving a first lateral acceleration value from the primary lateral acceleration data source and a second lateral acceleration value from the redundant lateral acceleration data source, generating a normalized yaw value as a function of the first yaw value and the second yaw value, generating a normalized lateral acceleration value as a function of the first lateral acceleration value and the second lateral acceleration value, determining whether the primary yaw data source and the primary lateral acceleration data source are operating correctly, utilizing the first yaw value for operation of the vehicle ESC system if the primary yaw data source is operating correctly, utilizing the first lateral acceleration value for operation of the vehicle ESC system if the primary lateral acceleration data source is operating correctly, utilizing the second yaw value for operation of the vehicle ESC system if the primary yaw data source is not operating correctly and the second yaw value is not greater in absolute value than the normalized yaw value, and utilizing the second lateral acceleration value for operation of the vehicle ESC system if the primary lateral acceleration data source is not operating correctly and the second lateral acceleration value is not greater in absolute value than the normalized lateral acceleration value.

An apparatus is provided for a vehicle electronic stability control ("ESC") system. In one embodiment, and by way of example only, the vehicle ESC system comprises a receiver and a processor. The receiver is configured to receive a first yaw value from a primary yaw data source, a second yaw value from a redundant yaw data source, a first lateral acceleration value from a primary lateral acceleration data source, and a second lateral acceleration value from a redundant lateral acceleration data source. The processor is coupled to the receiver, and is configured to generate a normalized yaw value as a function of the first yaw value and the second yaw value, generate a normalized lateral acceleration value as a function of the first lateral acceleration value and the second lateral acceleration value, determine whether the primary yaw data source and the primary lateral acceleration data source are operating correctly, utilize the first yaw value for operation of the vehicle ESC system if the primary yaw data source is operating correctly, utilize the first lateral acceleration value for operation of the vehicle ESC system if the primary lateral acceleration data source is operating correctly, utilize the second yaw value for operation of the vehicle ESC system if the primary yaw data source is not operating correctly and the second yaw value is not greater in absolute value than the normalized yaw value, and utilize the second lateral acceleration value for operation of the vehicle ESC system if the primary lateral acceleration data source is not operating correctly and the second lateral acceleration value is not greater in absolute value than the normalized lateral acceleration value.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
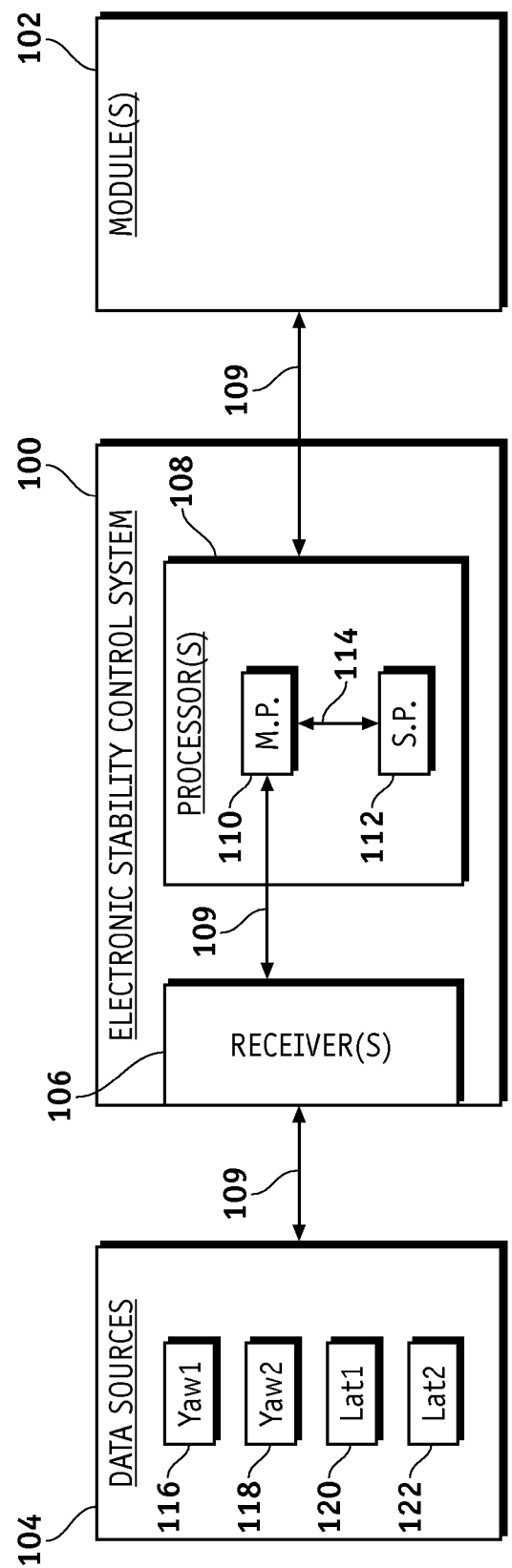
FIG. 1 is a simplified block diagram of an embodiment of a vehicle electronic stability control system for controlling one or more vehicle modules based on data received from a plurality of sources.

FIG. 1 depicts an exemplary vehicle electronic stability control ("ESC") system 100 for controlling operation of one or more vehicle modules 102 based on data received from a plurality of data sources 104. The ESC system 100 includes one or more receivers 106 and one or more processors 108.

The receivers 106 are in operable communication with the data sources 104 and the processors 108. Specifically, the receivers 106 receive various data values from the data sources 104 and provide the data values to the processors 108 for processing. The receivers 106 communicate with the data sources 104 and the processors 108 via one or more interfaces 109. Such interfaces 109 may include, by way of example only, any one of a number of different types of serial, parallel, wireless or other data communication media, such as a Serial Peripheral Interface (SPI) connection, or any one of a number of other different types of media.

The processors 108 are in operable communication with the receivers 106 and the modules 102, preferably via one or more interfaces 109 of the types discussed above. The processors 108 are configured to analyze the data values received by the receivers 106, and to perform various calculations and generate normalized values therefrom. The processors 108 additionally monitor the operation of the data sources 104 and determine whether specific data sources 104 are operating correctly, selectively control the modules 102 based at least in part on data from the data sources 104 and the analysis and calculations pertaining thereto, and terminate such module 102 control and/or other ESC system 100 operation with a smooth transition, when appropriate, based at least in part on the data provided by the data sources 104.

Preferably the processors 108 include one or more main processors 110 for communication with the receivers 106 and modules 102, and one or more sub-processors 112 for performing back-up calculations and/or monitoring performance of the main processor 110. Such main processors 110 and sub-processors 112 are preferably interconnected by a conventional data connection 114 as appropriate. The data connection 114 may include a UART or other internal connection (e.g. a bus connection) within the ESC system 100, and/or any one of a number of other different types of connections.

It will be appreciated that the structure of the ESC system 100 may vary, and may include any number of different receivers 106, processors 108, and/or other components. It will similarly be appreciated that one or more of the data sources 104, modules 102, components thereof, and/or any one or more of a number of other types of devices or subsystems may also be included as part of the ESC system 100, and/or that various other features of the ESC system 100 may vary.

The data sources 104 preferably include a plurality of non-depicted sensors, actuators, indicators, or other components, each measuring data values of at least one variable relevant to the operation of the ESC system 100. In the depicted embodiment, the data sources 104 include primary and redundant yaw data sources 116, 118 for providing yaw data values, and primary and redundant lateral acceleration data sources 120, 122 for providing lateral acceleration data values, each having non-depicted sensors for measuring such data values.

Each data source 104 may also include one or more non-depicted processors, or may use one or more of the processors 108 of the ESC system 100, and/or any number of other different types of processors, devices, or systems, to help measure, provide, determine, and/or check the data values. Similarly, as noted above, various data sources 104, or portions thereof, may be part of the ESC system 100, or vice versa. For example, a main processor 110 may be part of, or analyze data from, the primary yaw data source 116, the primary lateral acceleration data source 120, and/or various other data sources 104, and a sub-processor 112 may be part of, or analyze data from, the redundant yaw data source 118, the redundant lateral acceleration data source 122, and/or various other data sources 104.

During normal operation, the processors 108 generally utilize data from the primary yaw data source 116 and the primary lateral acceleration data source 120 for operation of the ESC system 100 and control over the modules 102, and use data from the redundant yaw data source 118 and the redundant lateral acceleration data source 122 for conducting any one of numerous different types of cross-checks on the primary yaw data source 116 and the primary lateral acceleration data source 120. If it is determined that either the primary yaw data source 116 or the primary lateral acceleration data source 120 is not operating correctly, then the ESC system 100 undertakes a graceful exit or phase-out of operation and/or control over the modules 102, as will be described in greater detail further below.

The modules 102 may include any number of different vehicle modules, devices, or systems, for example, the vehicle engine, transmission, brakes, suspension, and/or other components of the vehicle or combinations thereof The processors 108 may control the operation of the modules 102 in whole or in part, either directly or indirectly via any one or more of a number of different interfaces 109, devices, or systems, which may be a part of, and/or communicate with, the ESC system 100 and/or one or more of the modules 102.

Figure 2:
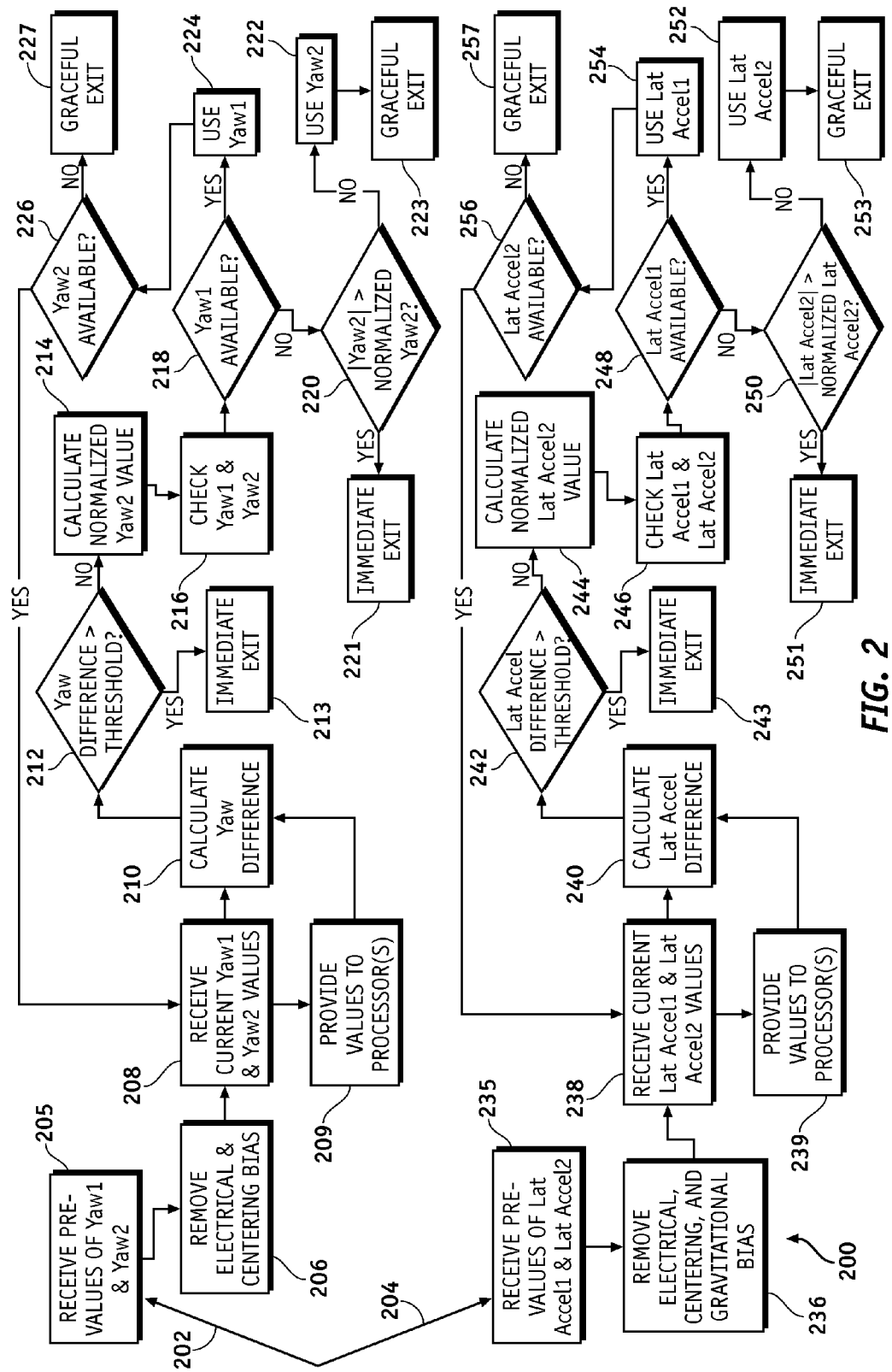
FIG. 2 is a flowchart of an embodiment of an operational process that can be used for operating, and providing an effective transition out of operating, the vehicle electronic stability control system of FIG. 1.

Turning now to FIG. 2, an operational process 200 is depicted for operating the ESC system 100, and in particular for conducting a smooth transition toward termination of ESC system 100 operation and/or control over the modules 102 if one or more of the data sources 104 are compromised. In the depicted embodiment, the operational process 200 includes various steps along a first path 202 pertaining to a yaw variable, and a second path 204 pertaining to a lateral acceleration variable. Preferably the steps of the first path 202 and the second path 204 are conducted simultaneously or at least substantially concurrently; however, the first and second paths 202, 204 will be discussed sequentially below for ease of reference. It will be appreciated that the operational process 200 may instead include only a single path for a single variable, and/or multiple other paths for different variables instead of or in addition to the above-mentioned first and second paths 202, 204.

Proceeding first along the first path 202, in step 205 the receivers 106 receive pre-values of yaw data from the primary yaw data source 116 and the redundant yaw data source 118. Next, in step 206, the main processor 110 uses these pre-values to remove any electrical or centering bias from the primary and redundant yaw data sources 116, 118, using any number of different techniques known in the art, so that values from the primary yaw data source 116 and the redundant yaw data source 118 are equal to one another. Preferably steps 205 and 206 are conducted shortly after the vehicle has started up.

After the bias has been removed, the receivers 106 subsequently receive, in step 208, current yaw values from the primary yaw data source 116 and the redundant yaw data source 118. These values are then provided in step 209 to the main processor 110 which, in step 210, calculates a yaw difference therefrom. Preferably the yaw difference is an absolute value of a current yaw value from the primary yaw data source 116 subtracted from a current yaw value from the redundant yaw data source 118, or vice versa. In step 212, the main processor 110 determines whether the yaw difference is greater than a predetermined threshold, preferably reflecting a range of expected or acceptable variability between yaw values from the primary and redundant yaw data sources 116, 118. If it is determined in step 212 that the yaw difference is greater than the predetermined threshold, then the process proceeds to an immediate exit in step 213, in which the ESC system 100 ceases operation and/or control over the modules 102 as quickly as possible. If it is determined in step 212 that the yaw difference is less than or equal to the predetermined threshold, then the process proceeds to step 214, as described below.

Next, in step 214, the main processor 110 calculates a normalized redundant yaw value. Preferably the normalized redundant yaw value is calculated in step 214 as a function of the current yaw values received in step 208. Also, preferably the normalized redundant yaw value is equal to the current yaw value received from the primary yaw data source 116 plus a predetermined percentage of an average of the current yaw values received from the primary and redundant yaw data sources 116, 118. Most preferably, the predetermined percentage is approximately five and a half percent, and the normalized redundant yaw value is calculated according to the following equation:

$$NRYV=PYV+(X)*[(PYV+RYV)/2],$$

in which NRYV is the calculated normalized redundant yaw value, PYV is the current yaw value from the primary yaw data source 116, RYV is the current yaw value from the redundant yaw data source 118, and X is a predetermined percentage. In one exemplary embodiment, X may be approximately five and a half percent, or 0.055. However, it will be appreciated that the normalized redundant yaw value may be calculated differently, for example with a different predetermined percentage and/or other differences to the equation above.

In step 216, one or more of the processors 108 check for errors in the primary and redundant yaw data sources 116, 118, and specifically whether the primary and redundant yaw data sources 116, 118 are available and operating correctly. The processors 108 then determine, in step 218, whether the primary yaw data source 116 is available and operating correctly. If it is determined in step 218 that the primary yaw data source 116 is not operating correctly then, in step 220, the processors 108 determine whether the absolute value of the current yaw value from the redundant yaw data source 118 is greater than the normalized redundant yaw value.

If it is determined in step 220 that the absolute value of the current yaw value from the redundant yaw data source 118 is greater than the normalized redundant yaw value, then the process proceeds in step 221 to an immediate exit, in which the ESC system 100 ceases operation and/or control over the modules 102 as quickly as possible. If it is determined in step 220 that the absolute value of the current yaw value from the redundant yaw data source 118 is less than or equal to the normalized redundant yaw value, then the process proceeds to step 222, in which the processors 108 utilize current yaw values from the redundant yaw data source 118, instead of from the primary yaw data source 1 16, in operation of the ESC system 100 and/or control over the modules 102. Next, in step 223, the process transitions to a graceful exit while using these current yaw values from the redundant yaw data source 11 8. Preferably, following the graceful exit, the ESC system 100 ceases operation and/or control over the modules 102. Steps 222 and 223 thus result in a phase-out of ESC system 100 operation or control over a particular time period. This phase-out time period is preferably approximately a few seconds in duration, although this may vary.

If it is determined in step 218 that the primary yaw data source 116 is operating correctly, then the processors 108 in step 224 continue to utilize current yaw values from the primary yaw data source 116 in operation of the ESC system 100 and/or control over the modules 102. The processors 108 then determine, in step 226, whether the redundant yaw data source 118 is available and operating correctly.

If it is determined in step 226 that the redundant yaw data source 118 is not operating correctly then, in step 227, the process transitions to a graceful exit while continuing to use, in the interim, the current yaw values from the primary yaw data source 116. Preferably, step 227 is a phase-out of ESC system 100 operation or control over a short time period, such as a few seconds in duration, although this may vary. Following the graceful exit, the ESC system 100 ceases operation and/or control over the modules 102. If it is determined in step 226 that the redundant yaw data source 118 is operating correctly, then the process returns to step 208, in which new current yaw values are obtained from the primary and redundant yaw data sources 116, 118, and the process continues. In either case, in the time period immediately following step 218, the ESC system 100 continues to use the current yaw value from the primary yaw data source 116 for operation of the ESC system 100 and/or control of the modules 102.

Meanwhile, the second path 204 begins with step 235, in which the receivers 106 receive pre-values of lateral acceleration data from the primary lateral acceleration data source 120 and the redundant lateral acceleration data source 122. Next, in step 236, the main processor 110 uses these pre-values to remove any electrical, centering, or gravitational bias from the primary and redundant lateral acceleration data sources 120, 122, using any number of different techniques known in the art, so that values from the primary lateral acceleration data source 120 and the redundant lateral acceleration data source 122 are equal to one another. Preferably, steps 235 and 236 are conducted shortly after the vehicle has started up.

After the bias has been removed, the receivers 106 subsequently receive, in step 238, current lateral acceleration values from the primary lateral acceleration data source 120 and the redundant lateral acceleration data source 122. These values are then provided in step 239 to the main processor 110 which, in step 240, calculates a lateral acceleration difference therefrom. Preferably, the lateral acceleration difference is an absolute value of a current lateral acceleration value from the primary lateral acceleration data source 120 subtracted from a current lateral acceleration value from the redundant lateral acceleration data source 122, or vice versa. In step 242, the main processor 110 determines whether the lateral acceleration difference is greater than a predetermined threshold, preferably reflecting a range of expected or acceptable variability between lateral acceleration values from the primary and redundant lateral acceleration data sources 120, 122. If it is determined in step 242 that the lateral acceleration difference is greater than the predetermined threshold, then the process proceeds to an immediate exit in step 243, in which the ESC system 100 ceases operation and/or control over the modules 102 as quickly as possible. If it is determined in step 242 that the lateral acceleration difference is less than or equal to the predetermined threshold, then the process proceeds to step 244, as described below.

Next, in step 244, the main processor 110 calculates a normalized redundant lateral acceleration value. Preferably the normalized redundant lateral acceleration value is calculated in step 244 as a function of the current lateral acceleration values received in step 238. Also, preferably the normalized redundant lateral acceleration value is equal to the current lateral acceleration value received from the primary lateral acceleration data source 120 plus a predetermined percentage of an average of the current lateral acceleration values received from the primary and redundant lateral acceleration data sources 120, 122. Most preferably, the predetermined percentage is approximately five and a half percent, and the normalized redundant lateral acceleration value is calculated according to the following equation:

$$NRLAV = PLAV + (X)*[(PLAV + RLAV)/2],$$

in which NRLAV is the calculated normalized redundant lateral acceleration value, PLAV is the current lateral acceleration value from the primary lateral acceleration data source 120, RLAV is the current lateral acceleration value from the redundant lateral acceleration data source 122, and X is a predetermined percentage. In one exemplary embodiment, X may be approximately five and a half percent, or 0.055. However, it will be appreciated that the normalized redundant lateral acceleration value may be calculated differently, for example with a different predetermined percentage and/or other differences to the equation above.

In step 246, one or more of the processors 108 check for errors in the primary and redundant lateral acceleration data sources 120, 122, and specifically whether the primary and redundant lateral acceleration data sources 120, 122 are available and operating correctly. The processors 108 then determine, in step 248, whether the primary lateral acceleration data source 120 is available and operating correctly. If it is determined in step 248 that the primary lateral acceleration data source 120 is not operating correctly, then, in step 250, the processors 108 determine whether the absolute value of the current lateral acceleration value from the redundant lateral acceleration data source 122 is greater than the normalized redundant lateral acceleration value.

If it is determined in step 250 that the absolute value of the current lateral acceleration value from the redundant lateral acceleration data source 122 is greater than the normalized redundant lateral acceleration value, then the process proceeds in step 251 to an immediate exit, in which the ESC system 100 ceases operation and/or control over the modules 102 as quickly as possible. If it is determined in step 250 that the absolute value of the current lateral acceleration value from the redundant lateral acceleration data source 122 is less than or equal to the normalized redundant lateral acceleration value, then the process proceeds to step 252, in which the processors 108 utilize current lateral acceleration values from the redundant lateral acceleration data source 122, instead of from the primary lateral acceleration data source 120, in operation of the ESC system 100 and/or control over the modules 102. Next, in step 253, the process transitions to a graceful exit while using these current lateral acceleration values from the redundant lateral acceleration data source 122. Preferably, following the graceful exit, the ESC system 100 ceases operation and/or control over the modules 102. Steps 252 and 253 thus result in a phase-out of ESC system 100 operation or control over a particular time period. This phase-out time period is preferably approximately a few seconds in duration, although this may vary.

If it is determined in step 248 that the primary lateral acceleration data source 120 is operating correctly, then the processors 108 in step 254 continue to utilize current lateral acceleration values from the primary lateral acceleration data source 120 in operation of the ESC system 100 and/or control over the modules 102. The processors 108 then determine, in step 256, whether the redundant lateral acceleration data source 122 is available and operating correctly.

If it is determined in step 256 that the redundant lateral acceleration data source 122 is not operating correctly then, in step 257, the process transitions to a graceful exit while continuing to use, in the interim, the current lateral acceleration values from the primary lateral acceleration data source 120. Preferably, step 257 is a phase-out of ESC system 100 operation or control over a short time period, such as a few seconds in duration, although this may vary. Following the graceful exit, the ESC system 100 ceases operation and/or control over the modules 102. If it is determined in step 256 that the redundant lateral acceleration data source 122 is operating correctly, then the process returns to step 238, in which new current lateral acceleration values are obtained from the primary and redundant lateral acceleration data sources 120, 122, and the process continues. In either case, in the time period immediately following step 248, the ESC system 100 continues to use the current lateral acceleration value from the primary lateral acceleration data source 120 for operation of the ESC system 100 and/or control of the modules 102.

It will be appreciated that certain steps in the operational process 200 may vary and/or may be conducted simultaneously or in a different order than that depicted in FIG. 2. It will similarly be appreciated that various steps conducted by one or more of the processors 108 may be conducted by one or more main processors 110, sub-processors 112, or combinations thereof, regardless of how they are depicted in FIGS. 1 or 2 or described above. It will similarly be appreciated that the operational process 200 may be utilized in connection with any one or more of numerous different types of systems, sub-systems, or devices.

The operational process 200 and associated ESC system 100 are potentially advantageous in multiple respects. For example, the operational process 200 can provide a smooth and effective phase-out for transition out of ESC system 100 operation and/or control over the modules 102 when one or more of the data sources 104 may be compromised. Additionally, this can further improve operation and reliability of various sensors or data sources 104.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method of operating a vehicle electronic stability control ("ESC") system utilizing values for a variable obtained from a primary source and a redundant source, the method comprising the steps of:
    receiving a first value for the variable from the primary source;
    receiving a second value for the variable from the redundant source;
    generating a normalized value as a function of the first value and the second value;
    determining whether the primary source is operating correctly based on whether the primary source is available and whether there is an error in the first value or any other values obtained from the primary source;
    utilizing the first value for operation of the vehicle ESC system if the primary source is operating correctly; and
    utilizing the second value for operation of the vehicle ESC system if the primary source is not operating correctly and the second value is not greater in absolute value than the normalized value.

2. The method of claim 1, further comprising the step of:
    terminating operation of the vehicle ESC system if the primary source is not operating correctly.

3. The method of claim 2, wherein the step of terminating operation of the vehicle ESC system occurs if the second value is not greater in absolute value than the normalized value.

4. The method of claim 3, further comprising the steps of:
    determining whether the redundant source is operating correctly based on whether the redundant source is available and whether there is an error in the second value or any other values obtained from the redundant source; and
    terminating operation of the vehicle ESC system if the redundant source is not operating correctly.

5. The method of claim 1, further comprising the steps of:
    receiving a first pre-value for the variable from the primary source before receiving the first value;
    receiving a second pre-value for the variable from the redundant source before receiving the second value; and
    removing bias from the primary and redundant sources, based on the first and second pre-values, so that values from the primary and redundant sources are at least substantially equal to one another.

6. The method of claim 1, wherein the normalized value is equal to the first value plus a predetermined percentage of an average of the first and second values.

7. The method of claim 1, further comprising the step of:
    terminating operation of the vehicle ESC system if the first value and the second value differ by at least a predetermined amount.

8. A method of operating a vehicle electronic stability control ("ESC") system utilizing values for a yaw variable obtained from a primary yaw data source and a redundant yaw data source, and using values for a lateral acceleration variable obtained from a primary lateral acceleration data source and a redundant lateral acceleration data source, the method comprising the steps of:
    receiving a first yaw value from the primary yaw data source and a second yaw value from the redundant yaw data source;
    receiving a first lateral acceleration value from the primary lateral acceleration data source and a second lateral acceleration value from the redundant lateral acceleration data source;
    generating a normalized yaw value as a function of the first yaw value and the second yaw value;
    generating a normalized lateral acceleration value as a function of the first lateral acceleration value and the second lateral acceleration value;
    determining whether the primary yaw data source is operating correctly based on whether the primary yaw data source is available and whether there is an error in the first yaw value or any other values obtained from the primary yaw data source;
    determining whether the primary lateral acceleration data source is operating correctly based on whether the primary lateral acceleration data source is available and whether there is an error in the first lateral acceleration value or any other values obtained from the primary lateral acceleration data source;
    utilizing the first yaw value for operation of the vehicle ESC system if the primary yaw data source is operating correctly;
    utilizing the first lateral acceleration value for operation of the vehicle ESC system if the primary lateral acceleration data source is operating correctly;
    utilizing the second yaw value for operation of the vehicle ESC system if the primary yaw data source is not operating correctly and the second yaw value is not greater in absolute value than the normalized yaw value; and
    utilizing the second lateral acceleration value for operation of the vehicle ESC system if the primary lateral acceleration data source is not operating correctly and the second lateral acceleration value is not greater in absolute value than the normalized lateral acceleration value.

9. The method of claim 8, further comprising the step of:
    terminating operation of the vehicle ESC system if one or more of the primary yaw data source and the primary lateral acceleration data source are not operating correctly.

10. The method of claim 9, wherein:
    the step of terminating operation of the vehicle ESC system occurs if the second yaw value is not greater in absolute value than the normalized yaw value and the second lateral acceleration value is not greater in absolute value than the normalized lateral acceleration value.

11. The method of claim 10, further comprising the steps of:
    determining whether the redundant yaw data source is operating correctly based on whether the redundant yaw data source is available and whether there is an error in the second yaw value or any other values obtained from the redundant yaw data source;

determining whether the redundant lateral acceleration data source is operating correctly based on whether the redundant lateral acceleration data source is available and whether there is an error in the second lateral acceleration value or any other values obtained from the redundant lateral acceleration data source; and terminating operation of the vehicle ESC system if one or more of the redundant yaw data source and the redundant lateral acceleration data source are not operating correctly.

12. The method of claim 8, further comprising the steps of:

receiving a pre-first yaw value from the primary yaw data source before receiving the first yaw value;

receiving a pre-first lateral acceleration value from the primary lateral acceleration data source before receiving the first lateral acceleration value;

receiving a pre-second yaw value from the redundant yaw data source before receiving the second yaw value;

receiving a pre-second lateral acceleration value from the redundant lateral acceleration data source before receiving the second lateral acceleration value; removing bias from the primary and redundant yaw data sources, based on the pre-first and pre-second yaw values, so that values from the primary and redundant yaw data sources are at least substantially equal to one another; and removing bias from the primary and redundant lateral acceleration data sources, based on the pre-first and pre-second lateral acceleration values, so that values from the primary and redundant lateral acceleration data sources are at least substantially equal to one another.

13. The method of claim 8, wherein:

the normalized yaw value is equal to the first yaw value plus a first predetermined percentage of an average of the first and second yaw values; and the normalized lateral acceleration value is equal to the first lateral acceleration value plus a second predetermined percentage of the average of the first and second lateral acceleration values.

14. The method of claim 13, wherein the first and second predetermined percentages are both about five and a half percent.

15. The method of claim 8, further comprising the step of:

terminating operation of the vehicle ESC system if the first yaw value differs from the second yaw value by at least a first predetermined magnitude or the first lateral acceleration value differs from the second lateral acceleration value by at least a second predetermined magnitude.

* * * * *